United States Patent [19]
Nakamura

[11] Patent Number: 5,968,719
[45] Date of Patent: Oct. 19, 1999

[54] PHOTO FILMSTRIP AND SIDE PRINTING METHOD FOR THE SAME

[75] Inventor: Yoshihiko Nakamura, Kanagawa, Japan

[73] Assignee: Fuji Photo Film Co., Ltd., Kanagawa, Japan

[21] Appl. No.: 09/210,674

[22] Filed: Dec. 14, 1998

Related U.S. Application Data

[62] Division of application No. 08/837,455, Apr. 18, 1997, Pat. No. 5,885,759.

[30] Foreign Application Priority Data

Apr. 19, 1996 [JP] Japan ........................................ 8-98710

[51] Int. Cl.$^6$ .............................. G03C 11/02; G03C 5/02; G03B 17/24
[52] U.S. Cl. .......................... 430/394; 430/496; 430/501; 346/107.1; 346/107.2; 346/107.6; 396/315; 396/318; 396/578; 396/310; 396/311; 396/210
[58] Field of Search ..................................... 396/315, 318, 396/578, 310, 210, 311; 346/107.2, 107.6, 107.1; 430/496, 501, 394

[56] References Cited

U.S. PATENT DOCUMENTS

| | | | |
|---|---|---|---|
| 3,995,959 | 12/1976 | Shaber | 356/443 |
| 4,554,560 | 11/1985 | Kanaoka et al. | 347/259 |
| 4,914,471 | 4/1990 | Saiki et al. | 355/40 |
| 4,965,628 | 10/1990 | Olliver et al. | 355/41 |
| 5,671,452 | 9/1997 | Seikai | 396/318 |
| 5,885,759 | 3/1999 | Nakamura | 430/496 |

*Primary Examiner*—Mark F. Huff
*Attorney, Agent, or Firm*—Sughrue, Mion, Zinn, Macpeak & Seas, PLLC

[57] ABSTRACT

A photo filmstrip includes two side portions extending in a longitudinal direction, and has a leader, a trailer, and a series of effective frame regions arranged between the leader and the trailer. A series of bar codes are recorded on one of the side portions optically in a predetermined exposing condition, i.e., with light of an intensity suitable for the film speed. The bar codes are associated with the series of the effective frame regions. A test dot is recorded optically in the predetermined exposing condition, disposed in each of the leader and the trailer, for inspection of the optical recording.

9 Claims, 4 Drawing Sheets

PHOTO FILMSTRIP AND SIDE PRINTING METHOD FOR THE SAME

This is a divisional of application Ser. No. 08/837,455, filed Apr. 18, 1997, now U.S. Pat. No. 5,885,759, the disclosure of which is incorporated herein by reference.

BACKGROUND OF THE INVENTION

1. Field of the Invention

The present invention relates to a photo filmstrip and a side printing method for the same. More particularly, the present invention relates to a photo filmstrip and a side printing method for the same, in which results of a side printing operation can be inspected with convenience.

2. Description Related to the Prior Art

A photo filmstrip includes a series of bar codes or patterned codes recorded in one of its side portions. The photo filmstrip also includes a series of information signs, such as a manufacturer sign, a photo film type (photo film speed), a type sign, and the like. Those codes and signs are all recorded photographically in forms of latent images in a line for manufacturing the photo filmstrip. When the photo filmstrip is developed in a photo laboratory for the purpose of photofinishing, the codes and signs appear in forms of visible images. The bar codes or the patterned codes are read by a bar code reader incorporated in a photographic printer, in order to designate printing frame numbers and determine a printing condition.

If the bar codes or the patterned codes are erroneously read, the user and the photofinishing agent are involved with troubles. It is important to form the bar codes or the patterned codes under an exposing condition, i.e., light intensity suitable for the photo film speed, so that they have sufficient optical density after being developed. The photo filmstrip as produced is transferred to a subsequent line. In the course of transferring of the photo filmstrip, a predetermined number of samples of the photo filmstrip are separated from strips produced in each the lots of the line, and are transferred to an inspecting line. In the inspecting line, those samples of the photo filmstrip are developed, to visibilize the bar codes or the patterned codes. Then optical density of at least one of the bar codes or the patterned codes is measured, and evaluated to check acceptability of the exposing condition.

A single bar included in the bar codes or the patterned codes is defined to have only a width of 0.455±0.075 mm, and thus have a considerably small area. It is excessively difficult to measure the density of a single bar with stability, because the measurement is influenced by low density of unexposed portions around each single bar.

SUMMARY OF THE INVENTION

In view of the foregoing problems, an object of the present invention is to provide a photo filmstrip and a side printing method for the same, in which results of a side printing operation can be inspected with convenience.

In order to achieve the above and other objects and advantages of this invention, a photo filmstrip includes first and second side portions extending in a longitudinal direction, and has a leader, a trailer, and a series of effective frame regions arranged between the leader and the trailer. There are a series of information indicia, recorded on the first side portion optically in a predetermined exposing condition, i.e., with light of an intensity suitable for the film speed. The information indicia are associated with the series of the effective frame regions. At least one test dot is recorded optically in the predetermined exposing condition, and is located in at least one of the leader and the trailer, for inspection of the optical recording.

In a preferred embodiment, the test dot is recorded on the first side portion. When the test dot is detected acceptable by the inspection, then the series of the information indicia are estimated as being acceptable.

During inspection, the optical density of the test dot is subjected to measurement. The optical density is then evaluated to determine whether it is greater than a reference density. Each information indicia is a bar code for representing photo film information, and is associated with one of the effective frame regions.

The test dot has a width greater than a width of a bar included in the bar code. The test dot is substantially circular. The test dot has a width between 2 mm and 4 mm.

To record series of the information indicia, a side printer is used for optical recording on at least one of a first and second side portions a continuous photo film. The continuous photo film subsequently is cut to obtain a photo filmstrip of a predetermined length. The side printer includes a controller, and a conveyor for conveying the continuous photo film. A printing head is disposed to confront the continuous photo film on the conveyor, for optically recording a series of information indicia on the first side portion when confronted with positions of the series of the effective frame regions, and for optically recording at least one test dot on the first side portion when confronted with a position of at least one of the leader and the trailer, wherein the photo filmstrip is partially sampled after being produced, and subjected to inspection. When the test dot is detected acceptable by the inspection, then the series of information indicia are estimated as being acceptable.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
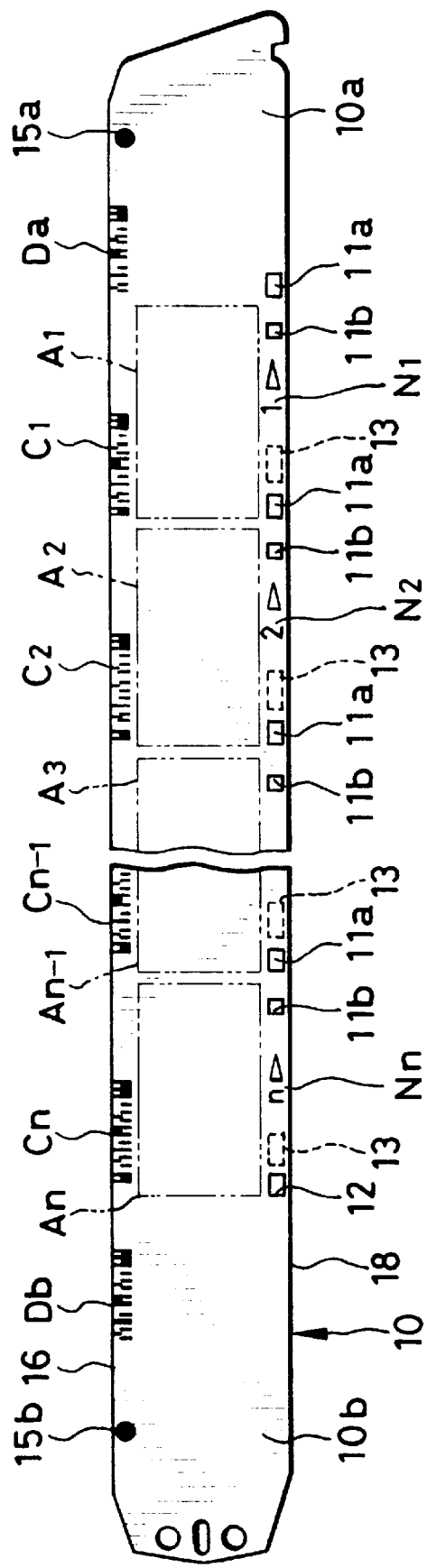
FIG. 1 is a plan, partially cutaway, illustrating a photo filmstrip.

In FIG. 1, a photo filmstrip 10 is illustrated. The photo filmstrip 10 has two side portions 18 and 16. Along the side portion 18, perforations 11a and 11b are regularly arranged. The photo filmstrip 10 has effective frame regions $A_1$, $A_2$, $A_3$, . . . , $A_{n-1}$ and $A_n$. The perforations 11a and 11b are formed in such a manner that each of the effective frame regions $A_1$, $A_2$, $A_3$, . . . , $A_{n-1}$ and $A_n$ is associated with two of the perforations 11a and 11b. There is an individual perforation 12 formed in a position of a rear edge of the final effective frame region $A_n$. The perforations 11a and 11b are used for setting each of the effective frame regions $A_1$–$A_n$ in a position of an exposure aperture inside a camera. The individual perforation 12 is single, and used for detection of the final effective frame region $A_n$.

Figure 2:
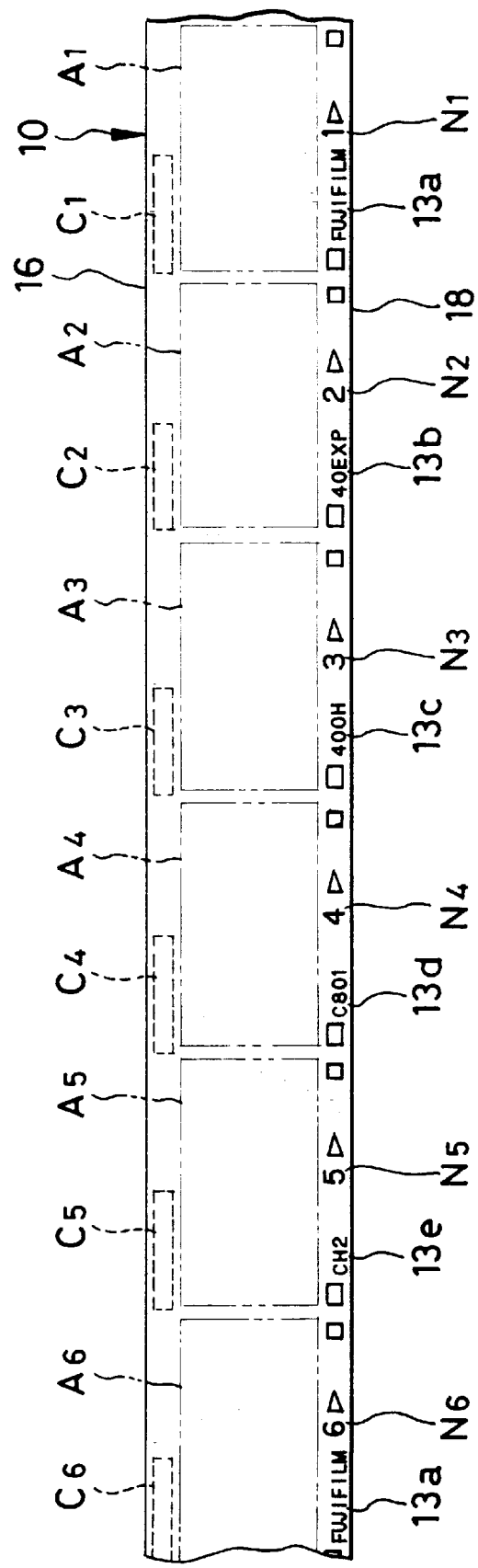
FIG. 2 is a plan, partially cutaway, illustrating the photo filmstrip after being developed.

Along the side portion 18, there are serial signs 13, frame numbers $N_1, N_2, N_3, \ldots, N_{n-1}$ and $N_n$, and arrow signs, all of which are aligned with the perforations 11a and 11b and the individual perforation 12, as well as being associated with the effective frame regions $A_1–A_n$. In FIG. 2, the serial signs 13 are shown in enlargement, and include a manufacturer sign 13a, a maximum frame number 13b (40 EXP), a photo film type 13c (400H), an emulsion number 13d (C801) and a type sign 13e (CH2). The five signs 13a–13e are cyclically repeated in sequence every five regions of frame by starting at the initial effective frame region $A_1$. The serial signs 13a–13e, the frame numbers $N_1–N_n$ and the arrow signs are all recorded in a common exposing condition, i.e, with light of the same intensity, photographically in forms of latent images.

In FIG. 1, there are bar codes $C_1, C_2, C_3, \ldots, C_{n-1}$ and $C_n$ recorded along the side portion 16 of the photo filmstrip 10 and respectively associated with the effective frame regions $A_1–A_n$. The photo filmstrip 10 has a leader 10a and a trailer 10b. Additional bar codes $D_a$ and $D_b$ are respectively recorded in the leader 10a and the trailer 10b. A test dot 15a is recorded in the leader 10a in a position between the additional bar code $D_a$ and a distal end of the leader 10a. A test dot 15b is recorded in the trailer 10b in a position between the additional bar code $D_b$ and a distal end of the trailer 10b. In other words, the test dots 15a and 15b are in positions farther from the series of the effective frame regions $A_1–A_n$ than the additional bar codes $D_a$ and $D_b$. The bar codes $C_1–C_n$ respectively represent information of an associated one of the frame numbers and the photo film type. The additional bar codes $D_a$ and $D_b$ represent information including the maximum frame number and an identification number, such as required for photographic printing operations. The test dots 15a and 15b are circular, have a diameter between 2 mm and 4 mm inclusive, and are shaped as solid spots which do not have any surrounded blank portion. In the present embodiment, the test dots 15a and 15b are exactly 2 mm across. The bar codes $C_1–C_n$, the additional bar codes $D_a$ and $D_b$, and the test dots 15a and 15b are all recorded in a common exposing condition, i.e., with light of the same intensity, photographically in forms of latent images.

Figure 3:
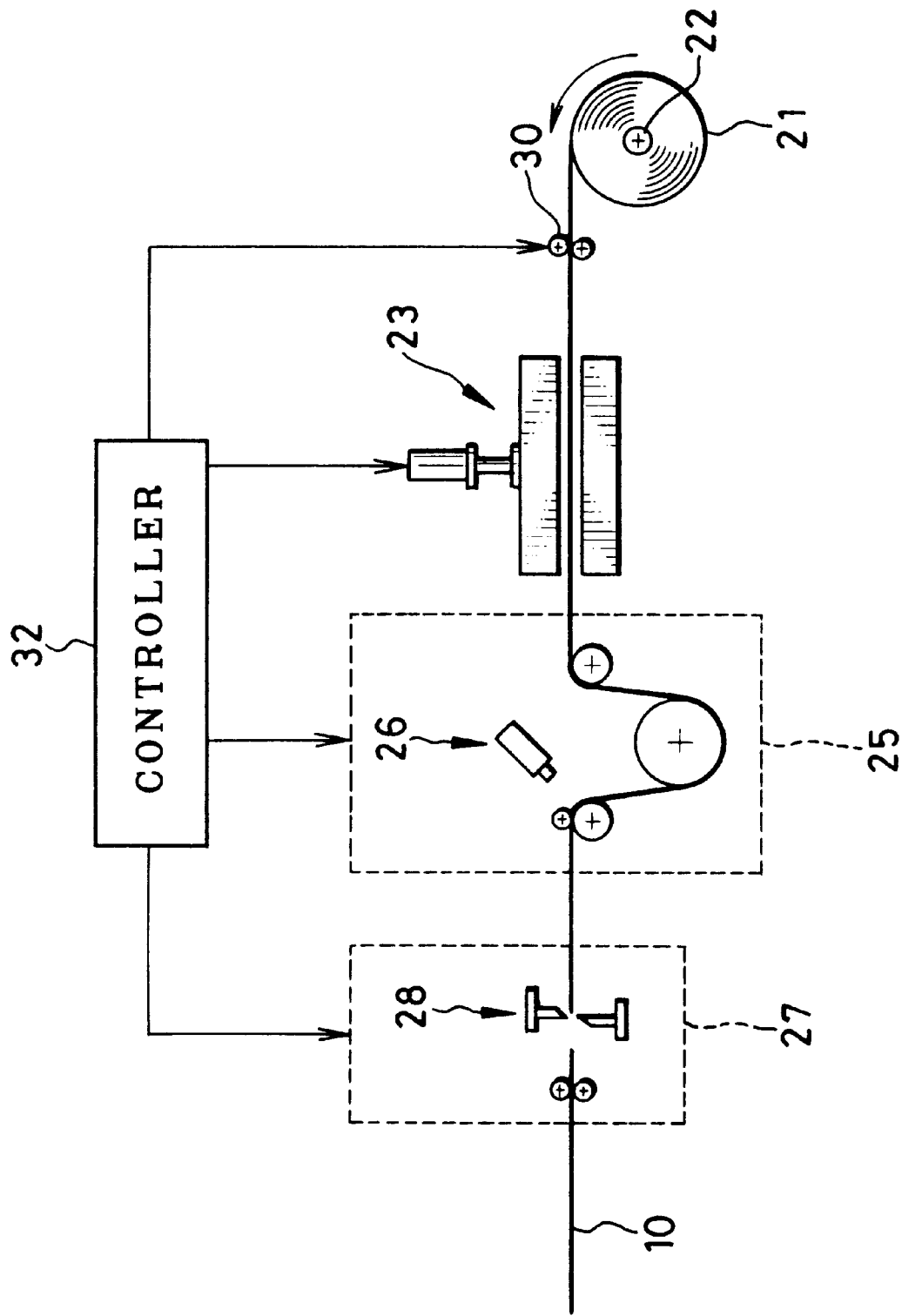
FIG. 3 is an explanatory view schematically illustrating a side printing apparatus for the photo filmstrip.

In FIG. 3, a line for manufacturing the photo filmstrip 10 is illustrated. A continuous photo film 21 is wound about a support shaft 22. The continuous photo film 21 has been coated with photographic emulsion, and slitted to have a width of the photo filmstrip 10. The continuous photo film 21 is conveyed through a perforator 23 at first by a conveyor 30 including pairs of rollers. The perforator 23 is controlled by a controller 32, and forms the perforations 11a and 11b associated with the effective frame regions $A_1–A_n$, and the individual perforation 12 associated with the effective frame region $A_n$.

The continuous photo film 21, after being subjected to the perforating operation forming the perforations 11a and 11b and the individual perforation 12, is conveyed to a side printer 25. The side printer 25 includes a printing head 26, which comprises arrays of plural minute light-emitting diodes (LED). The continuous photo film 21 is moved past the front of the printing head 26 at a regular speed, while the printing head 26 records the various information indicia on the side portions 16 and 18. To be precise, the printing head 26 records the test dots 15a and 15b, the bar codes $C_1–C_n$, and the additional bar codes $D_a$ and $D_b$ in the side portion 16, and records the serial signs 13a–13e, the frame numbers $N_1–N_n$, and the arrows in the side portion 18. Having been subjected to this recording operation, the continuous photo film 21 is conveyed by the conveyor 30 to a trimmer 27, in which cutter blades 28 cut the photo filmstrip 10 from the continuous photo film 21 by a predetermined length and with a predetermined shape.

The photo filmstrip 10, cut away from the continuous photo film 21, is transferred to a line for assembling parts of a photo film cassette. In the course of the transfer of the photo filmstrip 10, a predetermined number of samples of the photo filmstrip 10 are separated from strips produced in each of the lots of the line, and are transferred to an inspecting line or inspecting station. In the inspecting line, those samples of the photo filmstrip 10 are developed, to visibilize the bar codes $C_1–C_n$, the additional bar codes $D_a$ and $D_b$, the test dots 15a and 15b, the serial signs 13a–13e, the frame numbers $N_1–N_n$, and the arrows. Then, the optical density of at least one of the test dots 15a and 15b is measured, and evaluated to check acceptability of the exposing condition. As the exposing condition of the test dots 15a and 15b is common to that of the bar codes $C_1–C_n$ and the additional bar codes $D_a$ and $D_b$, it is possible to regard the measured density as that of the bar codes $C_1–C_n$ and the additional bar codes $D_a$ and $D_b$. The test dots 15a and 15b have the diameter of at least 2 mm and thus have a sufficiently large area. Consequently the density can be measured in a reliable and stable manner without being influenced by low density of unexposed portions around the test dots 15a and 15b. This is advantageous over the prior art in which density of the bar codes $C_1–C_n$ and the additional bar codes $D_a$ and $D_b$ of developed samples has been measured directly.

Figure 4:
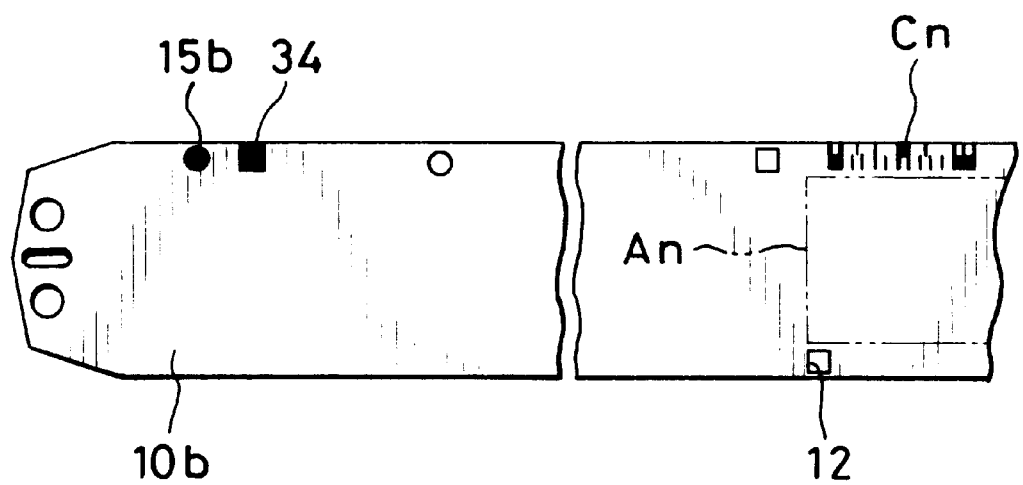
FIG. 4 is a plan, partially cutaway, illustrating another preferred embodiment of a photo filmstrip.

In the above embodiment, the test dots 15a and 15b are circular. But a test dot according to the present invention can be rectangular, polygonal or elliptical. FIG. 4 illustrates a rectangular test dot 34. Of course the photo filmstrip 10 can have two test dots, such as the test dot 15b and the rectangular test dot 34 in the trailer 10b. It is possible that the leader 10a has two test dots.

In the above embodiment during inspection, the optical density of the test dots 15a and 15b is subjected to measurement. The optical density is then evaluated to determine whether it is greater than a reference density. Alternatively during the inspection, it is possible to detect a size, a shape, or other characteristics of the test dots 15a and 15b for the purpose of checking their acceptability. The optical density to be measured can be either one of transmittance density and reflection density.

In the above embodiment, the test dots 15a and 15b are disposed in the side portion 16. But it is possible to form one or more test dots in the side portion 18, for the purpose of inspecting acceptability of optical recording of the serial signs 13a–13e, the frame numbers $N_1–N_n$, and the arrows.

Although the present invention has been fully described by way of the preferred embodiments thereof with reference to the accompanying drawings, various changes and modifications will be apparent to those having skill in this field. Therefore, unless these changes and modifications depart from the scope of the present invention, they should be construed as included therein.

What is claimed is:

1. A side printing method for recording information optically with a printing head on at least one of first and second side portions of continuous photo film, said continuous photo film subsequently being cut to obtain a plurality of lengths of photo filmstrip, each of said lengths of photo filmstrip having a leader, a trailer, and a series of effective frame regions arranged between said leader and said trailer, said side printing method comprising steps of:

conveying said continuous photo film;

recording a series of information indicia on said first side portion with said printing head, said series of said information indicia being associated with said series of said effective frame regions; and recording, with said printing head, at least one test dot on said first side portion of at least one of said lengths of photo filmstrip in a position of at least one of said leader and said trailer, wherein said at least one of said lengths of photo filmstrip is developed and subjected to inspection, and when said test dot is detected acceptable by said inspection, then said series of said information indicia are estimated as being acceptable.

2. A side printing method as defined in claim 1, wherein each of said information indicia is a bar code representing photo film information, and is associated with one of said effective frame regions.

3. A side printing method as defined in claim 2, wherein said test dot has a width greater than a width of a bar included in said bar code.

4. A side printing method as defined in claim 1, wherein said test dot is sized so that it does not overlap with said frame region.

5. A side printing method as defined in claim 1, wherein said test dot has a width between 2 mm and 4 mm.

6. A side printer for recording information optically on at least one of first and second side portions of continuous photo film, said continuous photo film subsequently being cut to obtain a plurality of lengths of photo filmstrip, each of said lengths of photo filmstrip having a leader, a trailer, and a series of effective frame regions arranged between said leader and said trailer, said side printer comprising:

a conveyor for conveying said continuous photo film;

a printing head, disposed to confront said first side portion of said continuous photo film on said conveyor; and a controller for causing said printing head to optically record a series of information indicia on said first side portion when confronted with positions of said series of said effective frame regions, and for causing said printing head to optically record at least one test dot on said first side portion when confronted with a position of at least one of said leader and said trailer.

7. A side printer as defined in claim 6, wherein each of said information indicia is a bar code representing photo film information, and is associated with one of said effective frame regions.

8. A side printer as defined in claim 7, wherein said test dot has a width greater than a width of a bar included in said bar code.

9. A side printer as defined in claim 6, wherein said controller causes said printing head to optically record said indicia and said at least one test dot with light of the same intensity such that when a length of photo filmstrip is developed and subjected to inspection, said series of indicia are estimated as acceptable when said test dot is detected acceptable.

* * * * *